(12) United States Patent
Yasuie et al.

(10) Patent No.: US 7,813,303 B2
(45) Date of Patent: Oct. 12, 2010

(54) NETWORK FAULT DETECTION APPARATUS

(75) Inventors: Takeshi Yasuie, Kawasaki (JP); Yuji Nomura, Kawasaki (JP); Norio Takeuchi, Nishitokyo (JP)

(73) Assignee: Fujitsu Limited, Kawasaki (JP)

( * ) Notice: Subject to any disclaimer, the term of this patent is extended or adjusted under 35 U.S.C. 154(b) by 503 days.

(21) Appl. No.: 11/391,703

(22) Filed: Mar. 28, 2006

(65) Prior Publication Data
US 2007/0127385 A1 Jun. 7, 2007

(30) Foreign Application Priority Data
Dec. 2, 2005 (JP) .............................. 2005-348859

(51) Int. Cl.
*H04L 12/28* (2006.01)
(52) U.S. Cl. ...................... 370/255; 370/242
(58) Field of Classification Search ............ 370/255, 370/242, 256, 258, 217, 336.1
See application file for complete search history.

(56) References Cited

U.S. PATENT DOCUMENTS 6,038,600 A * 3/2000 Faulk et al. ............. 709/224
6,665,305 B1 * 12/2003 Weismann ............... 370/401
6,810,021 B1 * 10/2004 Sakurai .................... 370/255
7,385,918 B2 * 6/2008 Takagi ..................... 370/222

FOREIGN PATENT DOCUMENTS

| JP | 2001-197114 | 7/2001 |
|----|-------------|--------|
| JP | 2002-252625 | 9/2002 |
| JP | 2004-320248 | 11/2004 |

OTHER PUBLICATIONS

Translation of Japanese application 2002-252625.*

* cited by examiner

*Primary Examiner*—Huy D Vu
*Assistant Examiner*—Dady Chery
(74) *Attorney, Agent, or Firm*—Katten Muchin Rosenman LLP

(57) ABSTRACT

A network fault detection apparatus, which detects L2 loops due to L3 bridge connections, is provided. A network fault detection apparatus acquires physical addresses corresponding to the network addresses of at least two nodes among the plurality of nodes constituting a network, and by detecting the existence of a plurality of physical addresses for network addresses of the two nodes, and detecting the existence of a physical address common to network addresses thereamong, detects an L2 loop caused by an L3 bridge connection, which induces a network fault.

10 Claims, 13 Drawing Sheets

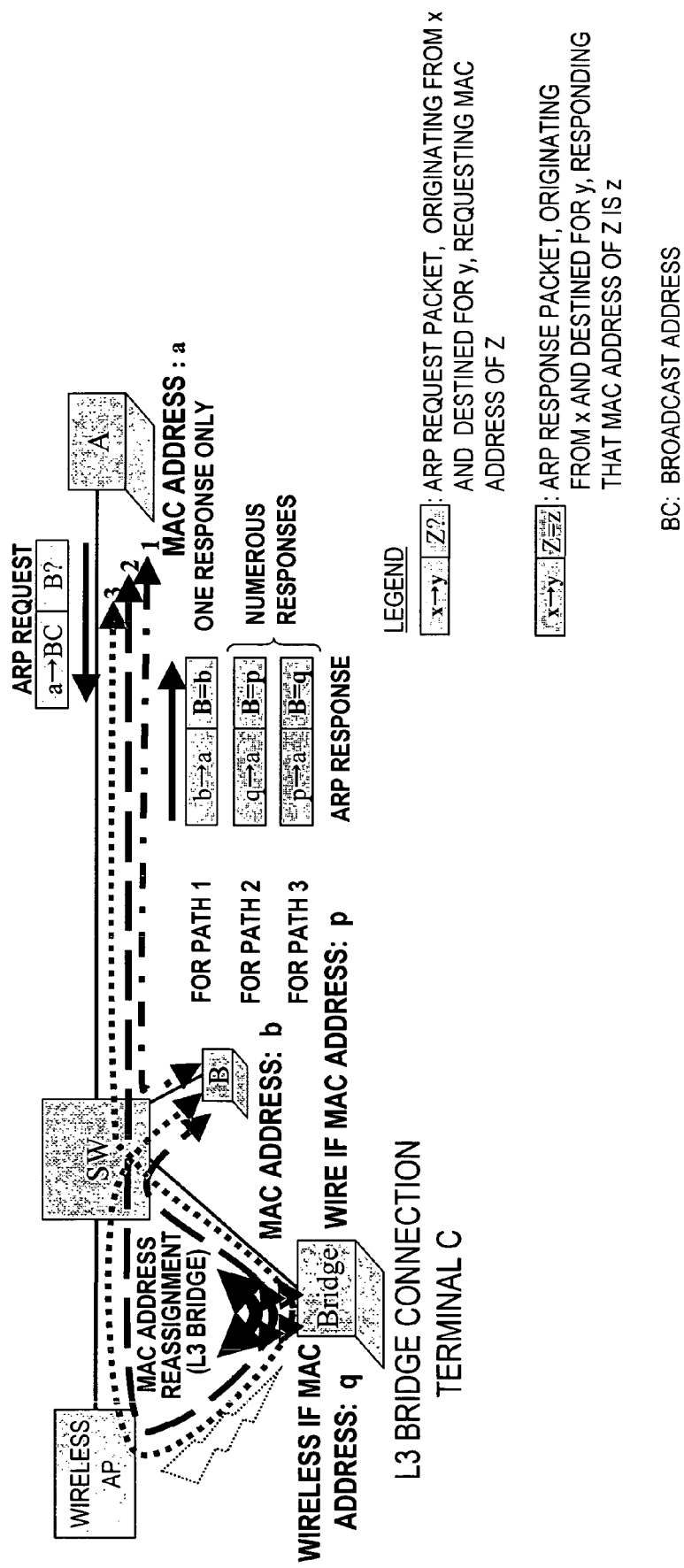

FIG. 6

ARP REQUEST/RESPONSE RESULTS

| ARP REQUEST DESTINATION IP ADDRESS | RESOLVED MAC ADDRESSES |
|---|---|
| A | a, p, q |
| B | b, p, q |

COMMON MAC ADDRESSES

FIG. 9

SOURCE ADDRESS MANAGEMENT TABLE

| SOURCE IP ADDRESS | SOURCE MAC ADDRESS |
|---|---|
| A | a, p, q |
| B | b, p, q |
| SW1 | s1, p, q |

COMMON MAC ADDRESSES

FIG. 11

BRIDGE CONNECTION TERMINAL MAC ADDRESS
LEARNING DIRECTIONS FOR EACH SW

| SW FOR SEARCHING | MAC ADDRESS p LEARNING DIRECTION | MAC ADDRESS q LEARNING DIRECTION |
|---|---|---|
| SW1 | 2 | 4 |
| SW2 | 5 | 1 |
| SW3 | 1 | 1 |
| SW4 | 1 | 1 |

FIG. 13

LARGE BROADCAST QUANTITY RECEPTION
IF DIRECTION FOR EACH SW

| SW FOR SEARCHING | IF DIRECTION OF RECEPTION OF LARGE QUANTITY OF BROADCASTS |
|---|---|
| SW1 | 2, 4 |
| SW2 | 1, 5 |
| SW3 | 1 |
| SW4 | 1 |

NETWORK FAULT DETECTION APPARATUS

CROSS-REFERENCE TO RELATED APPLICATIONS

This application is based upon and claims the benefit of priority from the prior Japanese Patent Application No. 2005-348859, filed on Dec. 2, 2005, the entire contents of which are incorporated herein by reference.

BACKGROUND OF THE INVENTION

1. Field of the Invention

The present invention relates to a network fault detection apparatus and network fault detection method for detecting faults occurring in a network, and in particular relates to a network fault detection apparatus and network fault detection method for detection of L2 (layer 2) loops by a L3 (layer 3) bridge connection.

2. Description of the Related Art

A relay device called a layer 2 (L2) switch, which is used to configure a LAN or other network, is one type of network relay device, and has functions to judge the destination of a packet using the data of the data link layer (second layer) in the OSI Reference Model and route the packet. The data link layer protocol includes MAC (Media Access Control) addressing in Ethernet (a registered trademark) and other networks; an Ethernet (a registered trademark) relay device which examines the MAC address and determines the data destination is called a switching hub. Because the IP, TCP, HTTP and other protocols are positioned in the network layer (third layer) and above, a layer 2 switch is capable of packet routing even when the third layer (layer 3) or higher protocols are different.

In a network in which a plurality of terminals are connected by a layer 2 switch, a fault called a layer 2 loop may occur over the entire network as a result of erroneous cable connection, a layer 2 switch malfunction, or for other reasons. Occurrence of a layer 2 loop may result in a high load state for terminals throughout the network, and may culminate in network communication failure.

A bridge connection is a function for causing a terminal to operate as a relay device (repeater) by means of a bridge connection in the terminal between two or more interfaces (IFs). In Windows XP (a registered trademark), a bridge connection normally performs bridge operations at the L2 level; but when the NIC (Network Interface Card) does not support promiscuous mode (random detection mode), the connections operates as an L3 (layer 3) bridge. In general, a wireless IF does not support promiscuous mode, and so a bridge connection which includes a wireless IF operates as an L3 bridge. In packet routing through an L3 bridge connection, when passing through the bridge there is temporary termination at the L2 level, and so the packet is routed with the packet source physical address reassigned. In Windows (registered trademark) operating systems, bridge connection functions are provided in XP and later versions.

There are cases in which an L2 loop occurs due to such an L3 bridge connection. An L2 loop caused by an L3 bridge connection indicates the existence of an L3 bridge connection terminal in the L2 loop. An L2 loop caused by an L3 bridge connection is explained below.

FIGS. 1A and 1B explains the mode of occurrence of an L2 loop due to an L3 bridge connection. As shown in FIG. 1A, terminals (notebook PCs) placed on either side of a wire IF and wireless IF normally use only one of the IFs for communication. Here, if for example the bridge connection function of Windows XP (a registered trademark) is used as a bridge connection between the two IFs, an L2 loop fault (L2 loop fault due to an L3 bridge connection) occurs, as in FIG. 1B, and the range of influence of the fault is the entire subnet; moreover, an extremely serious situation results in which communication between terminals within the subnet is impossible.

An L2 loop due to an L3 bridge connection similarly occurs not only for a wire IF and a wireless IF, but also when a packet routing path in a loop shape occurs due to a bridge connection between a plurality of wireless IFs.

Of late, notebook PCs have typically been provided with both wire IFs and with wireless IFs; and hereafter it is anticipated that there will be an increasing proportion of L2 loop faults caused by such L3 bridge connections.

FIG. 2 explains the cause of an L2 loop due to an L3 bridge connection. In FIG. 2, terminal C is an L3 bridge connection terminal which communicates with the switch SW via a wire IF and communicates with the wireless access point (AP) via a wireless IF. The switch SW is connected to terminals A and B via a wire IF. Consider a case in which terminal A transmits an ARP (Address Resolution Protocol) request in order to acquire the MAC address of terminal B. Here, as indicated in the figure, the MAC addresses of terminals A and B are respectively a and b, the wire IF MAC address of terminal C is p, and the wireless IF MAC address is q.

An ARP request is transmitted from terminal A to the broadcast address (BC). The ARP request is sent via the switch SW to terminal B, terminal C, and the wireless AP. Terminal C is an L3 bridge connection terminal, and so transmits the received ARP request to the wireless AP via the wireless IF. At this time, terminal C reassigns the ARP request source MAC address. The initial source address of the ARP request is the MAC address a of terminal A, but when passing through terminal C and output from the wireless IF, the source address is reassigned to the wireless IF MAC address q of terminal C. The ARP request with source address q passes through the wireless IF, reaches switch SW, and is transmitted to terminal B as a broadcast transmission from switch SW, and is also transmitted again to terminal C, forming an L2 loop. Hence a large number of ARP requests with source MAC address q are transmitted to terminal B.

On the other hand, the ARP request from terminal A is also transmitted to the wireless AP as a broadcast transmission from switch SW, and terminal C receives the ARP request from the wireless AP as well. In this case terminal C, as an L3 bridge connection terminal, transmits the received ARP request to switch SW via the wire IF. At this time, similarly to the operation described above, terminal C reassigns the source MAC address of the ARP request. However, in this case the route over which the ARP request flows is the opposite direction; the ARP request was output from the wire IF, and so the source address of the ARP request (which initially is "a") is reassigned to the wire IF MAC address p. The ARP request with source address p reaches the switch SW, and as a broadcast transmission from switch SW is transmitted to terminal B, and is also transmitted to the wireless AP once again, so that here too an L2 loop is formed. Hence a state ensues in which a large quantity of ARP requests with source MAC address p are sent to terminal B.

As explained above, terminal B receives ARP requests, with the source addresses a, q and p, and responds to these with ARP responses via unicast transmission. The path (1) shown is an ARP response to an ARP request with source address a; the correct ARP response, having the MAC address of terminal B, is transmitted to terminal A.

The path (2) shown in the figure is an ARP response to an ARP request with source address p. Because the ARP response is sent from terminal B to the MAC address p of terminal C (b→p), it is received by the wire IF of terminal C. Then, because of the L3 bridge function in terminal C, a MAC address reassignment takes place, and the ARP response is sent from the wireless IF of terminal C to terminal A (q→a). However, because in terminal C the MAC address for terminal B in the ARP response is reassigned from the correct address b to address p, the ARP response with an erroneous MAC address arrives at terminal A.

The path (3) shown in the figure is an ARP response to an ARP request with source address q. Because the ARP response is transmitted from terminal B via the wireless AP to the MAC address q of terminal C (b→q), it is received by the wireless IF of terminal C. Then, the L3 bridge connection in terminal C causes a MAC address reassignment to occur, and the ARP response is transmitted to terminal A from the wire IF of terminal C (p→a). However, because in terminal C the MAC address for terminal B in the ARP response is reassigned from the correct address b to address q, The ARP response with an erroneous MAC address arrives at terminal A.

In the ARP table of terminal A, the MAC address of the ARP response last received is registered; hence either the wire IF MAC address "p" or the wireless IF MAC address "q" for terminal C is registered in the ARP table as the MAC address of terminal B for communication. Hence terminal A enters a state in which communication with terminal B is not possible.

Thus when the cause of communication failure is an L2 loop caused by an L3 bridge connection, the loop occurs when the physical address of the packet source is reassigned in the bridge connection terminal (terminal C), so that at both end nodes performing communication, the physical address of the bridge connection terminal is registered in the ARP table as the physical address of the other-party terminal. Specifically, whereas the MAC address of the other-party terminal should be registered in the ARP table at each of the end nodes attempting communication, in fact it is the MAC address of the bridge connection terminal that is registered (the ARP table is a table which manages MAC addresses corresponding to IP addresses).

As technology to detect layer 2 loops which cause network faults, for example, a method is disclosed in Japanese Patent Laid-open No. 2001-197114 in which an L2 loop is detected by judging that a received frame is in an infinite loop through analysis of the frame. However, detection of an L2 loop due to an L3 bridge connection is not possible.

In the prior art, in order to identify the location of occurrence of an L2 loop caused by an L3 bridge connection, cables were disconnected and reconnected, and the equipment at wireless access points and similar was turned on and off repeatedly, in order to narrow down the location. Hence considerable time and labor is required before the location of the cause can be discovered. Further, because an L2 loop due to an L3 bridge connection is not a loop in the cable layout, it is difficult to ascertain the cause and location of the loop. Moreover, whereas an L2 loop resulting from an erroneous cable connection causes high loads on terminals and the network, an L2 loop caused by an L3 bridge connection results in low loads on terminals and the network itself, so that often more time is required to determine the cause and location.

Hence an object of this invention is to provide a network fault detection apparatus and network fault detection method capable of detecting L2 loops caused by L3 bridge connections and of rapidly identifying the location, without modifying existing relay devices.

SUMMARY OF THE INVENTION

A first configuration of a network fault detection apparatus of this invention to attain the above object is a network fault detection apparatus which detects faults in networks incorporating a plurality of nodes including a plurality of the above terminals and a plurality of relay devices, and also including an L3 bridge connection, which has a communication unit which receives packets having physical addresses corresponding to a first node and to a second node among the plurality of nodes; and a detection unit which, by detecting the existence of a plurality of physical addresses for each of the network addresses of the first node and second node and detecting the existence of a physical address common to network addresses thereamong, detects an L2 loop caused by an L3 bridge connection, which induces a network fault.

A second configuration of a network fault detection apparatus of this invention is the above-described first configuration, in which the detection unit identifies the common physical address as the physical address of an L3 bridge connection terminal.

A third configuration of a network fault detection apparatus of this invention is the above-described first configuration, in which the detection unit identifies each of the physical addresses other than the common physical address as the physical addresses of the first node and second node.

A fourth configuration of a network fault detection apparatus of this invention is the above-described first configuration, in which the communication unit broadcasts a request packet requesting a packet comprising the physical address corresponding to the network address of the first node and the second node, and receives, as the response to this request packet, a packet having the physical addresses.

A fifth configuration of a network fault detection apparatus of this invention is the above-described first configuration, in which the communication unit captures a packet having the physical addresses corresponding to the network addresses of the first node and the second node, among the packets circulating in the network.

A sixth configuration of a network fault detection apparatus of this invention is the above-described third configuration, in which the communication unit restores communication with the first node by unicasting, to the first node, a request packet requesting a packet having the physical address corresponding to the network address of the first node, in use of the physical address of the first node identified by the detection unit, and by receiving a response packet to the request packet.

A seventh configuration of a network fault detection apparatus of this invention is the above-described first configuration, in which the communication unit communicates with the first node by continuing to broadcast for a fixed length of time a request packet requesting a packet comprising the physical address corresponding to the network address of the first node, and by receiving a response packet to the request packet.

An eighth configuration of a network fault detection apparatus of this invention is the above-described second configuration, in which the communication unit acquires information relating to the direction of learning of the physical address of the L3 bridge connection terminal from the plurality of relay devices, and the detection unit judges the direction of the L3 bridge connection terminal based on this information.

A ninth configuration of a network fault detection apparatus of this invention is the above-described second configuration, in which the communication unit acquires information relating to the amount of broadcast packet traffic for each port from the plurality of relay devices, and the detection unit judges the direction of the L3 bridge connection terminal based on this information.

A network fault detection method of this invention, which detects faults in a network comprising a plurality of nodes, including a plurality of the above terminals and a plurality of relay devices, and also comprising an L3 bridge connection, having a step of receiving a packet having the physical addresses corresponding to the network addresses of a first node and a second node among the plurality of nodes, and a step of detecting the existence of a plurality of physical addresses for the network addresses of the first node and the second node, and detecting the existence of a physical address common to the network addresses, to detect an L2 loop caused by an L3 bridge connection, which induces a network fault.

According to this invention, by examining a phenomenon particular to an L2 loop caused by an L3 bridge connection, an L2 loop caused by an L3 bridge connection which induces a fault within the network can be detected, and the location of the occurrence can be identified.

Further, a network fault detection apparatus of this invention is a terminal of the network, and an L2 loop caused by an L3 bridge connection can be detected through the processing of a single terminal, so that the loop can be detected without requiring processing by a relay device of the network. That is, whereas a comparatively great amount of time and labor re required to equip a relay device with a new function, the present invention does not require such a measure, and processing can be executed by a terminal, to which new functions can easily be added merely through installation of an application program. Hence by installing an application to perform the processing of this invention in a terminal and executing the application, this invention can be realized simply, easily, and with general applicability.

BRIEF DESCRIPTION OF THE DRAWINGS

FIG. 2 explains the reason for the occurrence of an L2 loop due to an L3 bridge connection;

FIG. 6 shows an example of response results from each of terminals A and B;

FIG. 9 shows an example of a source address management table;

FIG. 11 shows learning IF circumstances for MAC addresses p and q of the bridge connection terminal in each switch;

DESCRIPTION OF THE PREFERRED EMBODIMENTS

Figure 1B:
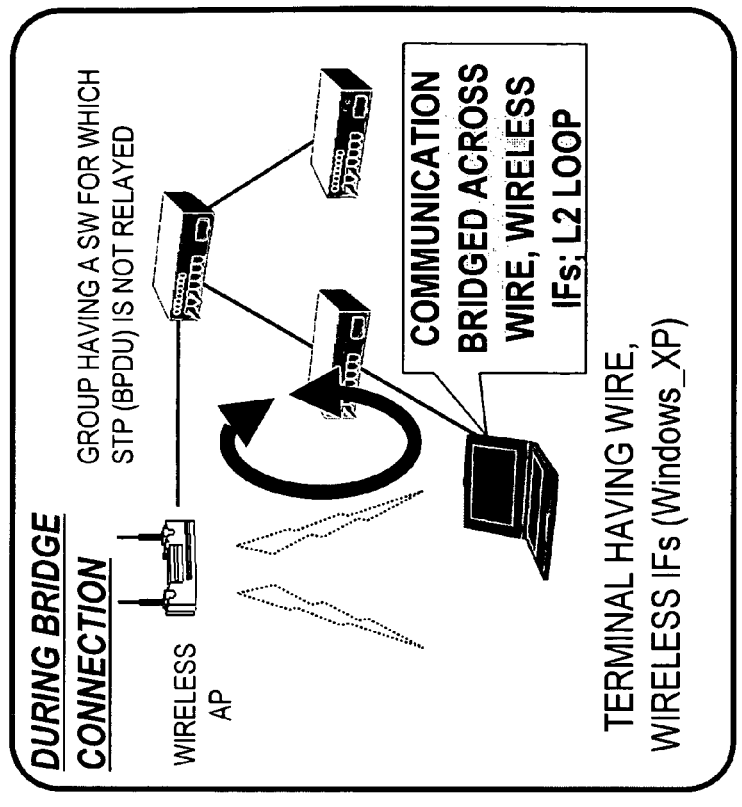
FIGS. 1A and 1B explain the mode of occurrence of an L2 loop due to an L3 bridge connection.
Figure 1A:
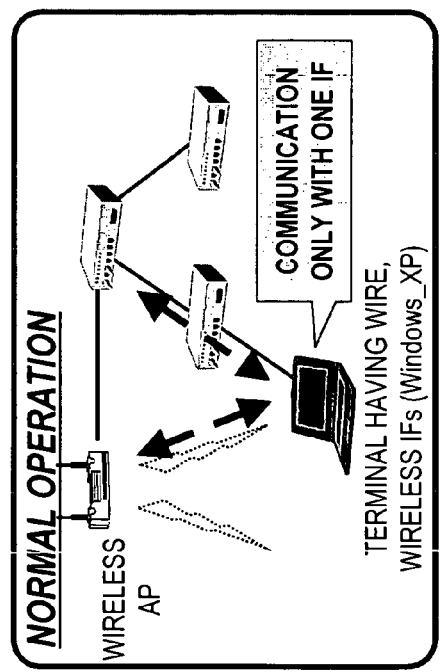

Below, aspects of the invention are explained, referring to the drawings. However, the aspects do not limit the technical scope of the invention.

A network fault detection apparatus in one aspect of the invention is realized as one function in a terminal within the network. The network fault detection apparatus transmits an address resolution protocol (ARP) request packet to a plurality of terminals, receives the response packets, and according to whether a response packet having a plurality of physical addresses (for example, MAC addresses) is received, judges whether there is an L2 loop due to an L3 bridge connection. That is, when an L2 loop has occurred due to an L3 bridge connection, in addition to the MAC address of the terminal for communication, response packets are received as the ARP response having a wire IF MAC response and wireless IF MAC address of the bridge connection terminal, in addition to the MAC address of the terminal for communication. Thus by ascertaining that a plurality of response packets are received having different MAC addresses, it is possible to detect the occurrence of an L2 loop due to an L3 bridge connection.

Even if an ARP request is not actively transmitted, by passively capturing broadcast packets, and detecting packets having a plurality of different source MAC addresses for the same source network address (for example, IP address), the occurrence of an L2 loop due to an L3 bridge connection can be detected.

In order to correctly re-register the MAC address of the terminal for communication in the ARP table of the network fault detection apparatus, it is sufficient to exchange an address resolution request/response between the two end nodes which are to communicate without passing through the bridge connection terminal; this is achieved by unicast transmission of an address resolution request (ARP) and reception of a response to and from the terminal for communication.

Unicast transmission of an address resolution request (ARP) specifically refers to setting the destination MAC address to the MAC address of the terminal for communication, whereas in a normal ARP request packet the destination MAC address is set to a broadcast address for transmission.

In order to perform unicast transmission, the MAC address of the terminal for communication must be acquired in advance. Because the unicast address has been identified, re-registration, if only in the ARP table of the node itself, is possible without transmitting or receiving an ARP request or response; but in order to perform re-registration in the ARP table of the terminal for communication, transmission of an ARP request, and reception of a response, are necessary.

In cases in which an address resolution request (ARP) is broadcast also, during the interval from the time in which the correct MAC address arrives from the node for communication until the next erroneous MAC address arrives, the MAC address is correctly registered in the ARP table of the terminal originating the ARP request. By continuing to broadcast an address resolution request (ARP) for the terminal for communication and receive responses while performing communication, the interval during which the MAC address is registered correctly can be utilized to realize communication with the node for communication (the originating terminal cannot distinguish correct and incorrect MAC addresses, but by receiving normal responses only when the MAC address is correct, communication becomes possible).

After performing this communication restoration processing, in order to finally identify the actual bridge location, a method of searching along the direction of connection of the physical address of the bridge connection terminal, and a method of searching by utilizing the characteristics of L2 loop traffic according to which the L2 loop is the source of a large quantity of broadcast packets, are conceivable.

In the method of searching along the direction of connection of the physical address of the bridge connection terminal, information pertaining to the direction of learning of the physical address of the bridge connection terminal is acquired from a terminal for searching (a switch or similar) in the L2 loop subnet, and by tracing along this direction, the location of the bridge connection terminal can be identified. This method requires that the MAC address of the bridge connection terminal be known in advance, but at the stage of detection of the L2 loop caused by the L3 bridge connection, the MAC address can be extracted.

The method of searching utilizing the characteristics of L2 loop traffic employs the characteristics according to which, whereas upon occurrence of an L2 loop the relay devices not comprised by the loop receive a large quantity of broadcast packets from one port in a certain direction, in those relay devices (including also the bridge connection terminal) comprised by the loop, there exist a loop right-hand and left-hand direction, so that a large quantity of broadcast packets are received at two ports; by acquiring statistical information on packet reception by ports of the relay devices, and ascertaining ports for which a large quantity of broadcast packets have been received per unit time, loop locations (including the bridge connection terminal) can be identified.

Figure 3:
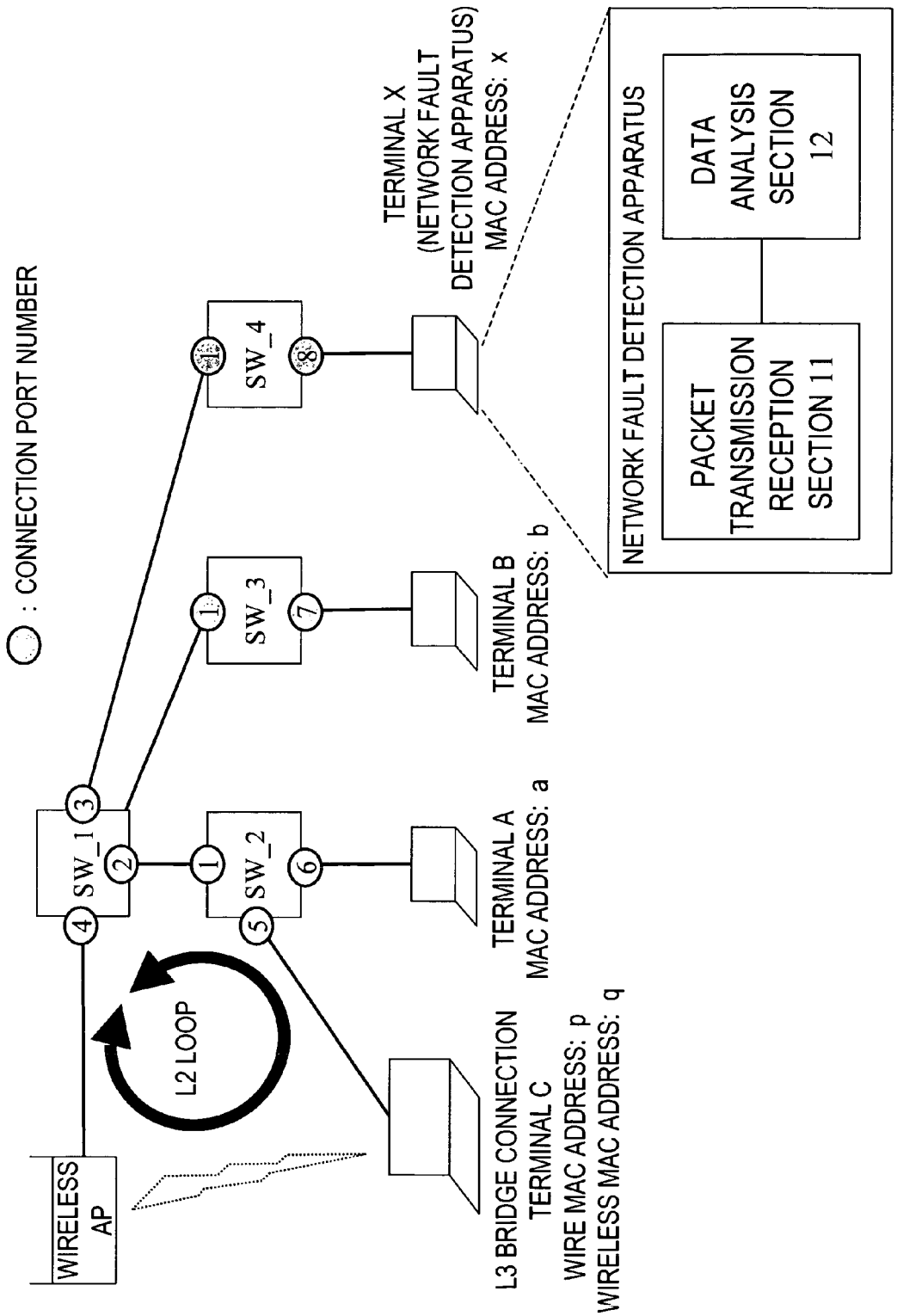
FIG. 3 shows an example of the configuration of a network comprising the network fault detection apparatus of an aspect of this invention.

FIG. 3 shows an example of a network configuration comprising the network fault detection apparatus of an aspect of the invention. In FIG. 3, the network is configured with switches SW2, SW3 and SW4 connected below switch SW1, and with terminals A, B and X connected to switches SW2, SW3 and SW4, respectively. Terminal X is the network fault detection apparatus, and comprises a packet transmission/reception unit 11 and data analysis unit 12 as functions for network fault detection. Terminals A and B are terminals for communication, with the respective MAC addresses a and b. Terminal C is an L3 bridge connection terminal, having a wire IF MAC address p and a wireless IF MAC address q. Terminal C is connected to the fifth port of switch SW2 via a wire IF, and is connected to a wireless AP (Access Point) via a wireless IF. The wireless AP is connected to the fourth port of switch SW1, so that an L2 loop resulting from an L3 bridge connection, comprising terminal C—switch SW2—switch SW1—wireless AP-terminal C, occurs.

(First Aspect)

Figure 4:
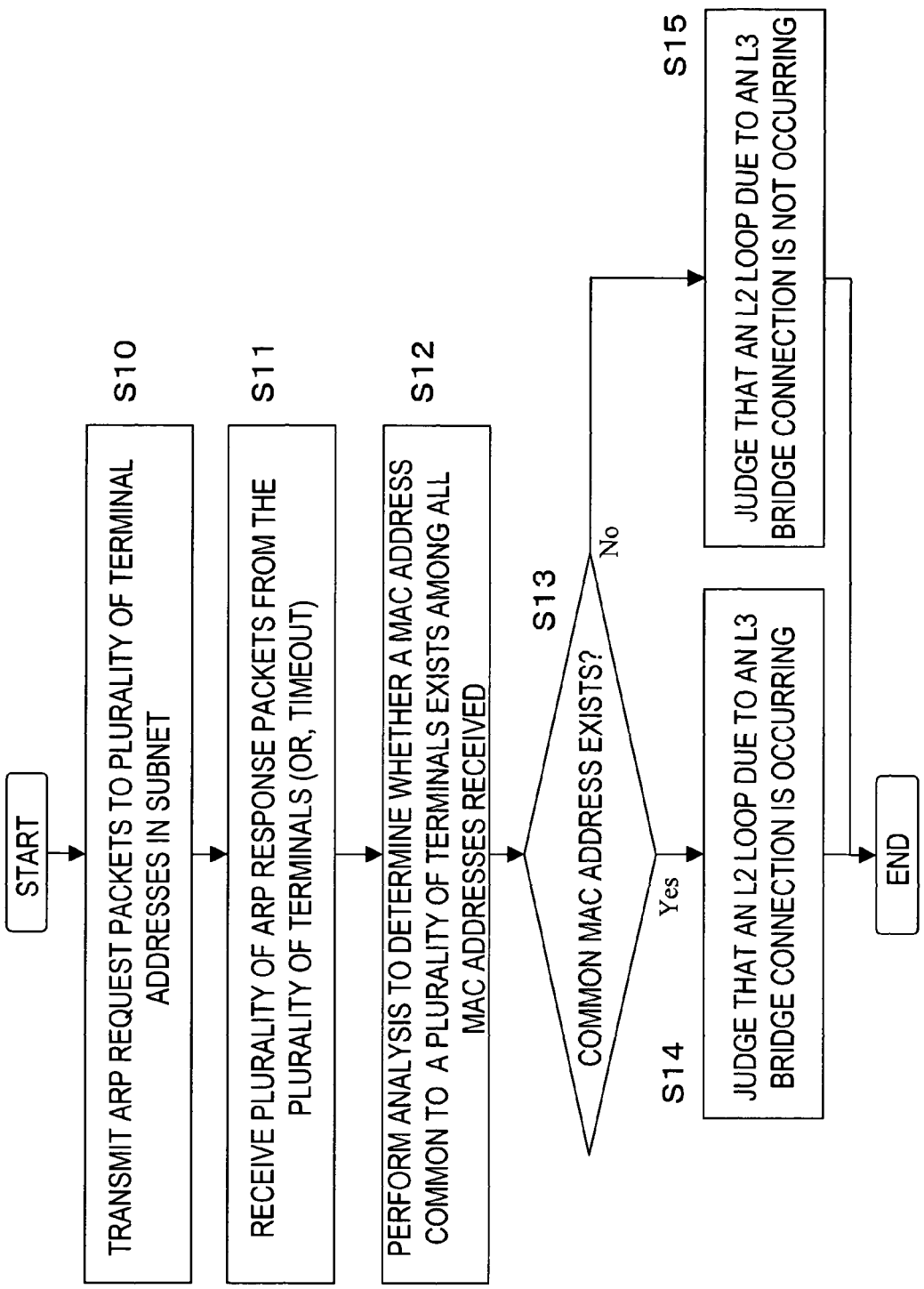
FIG. 4 is a flowchart of first detection processing to detect an L2 loop due to an L3 bridge connection by the network fault detection apparatus of an aspect of this invention.
Figure 5:
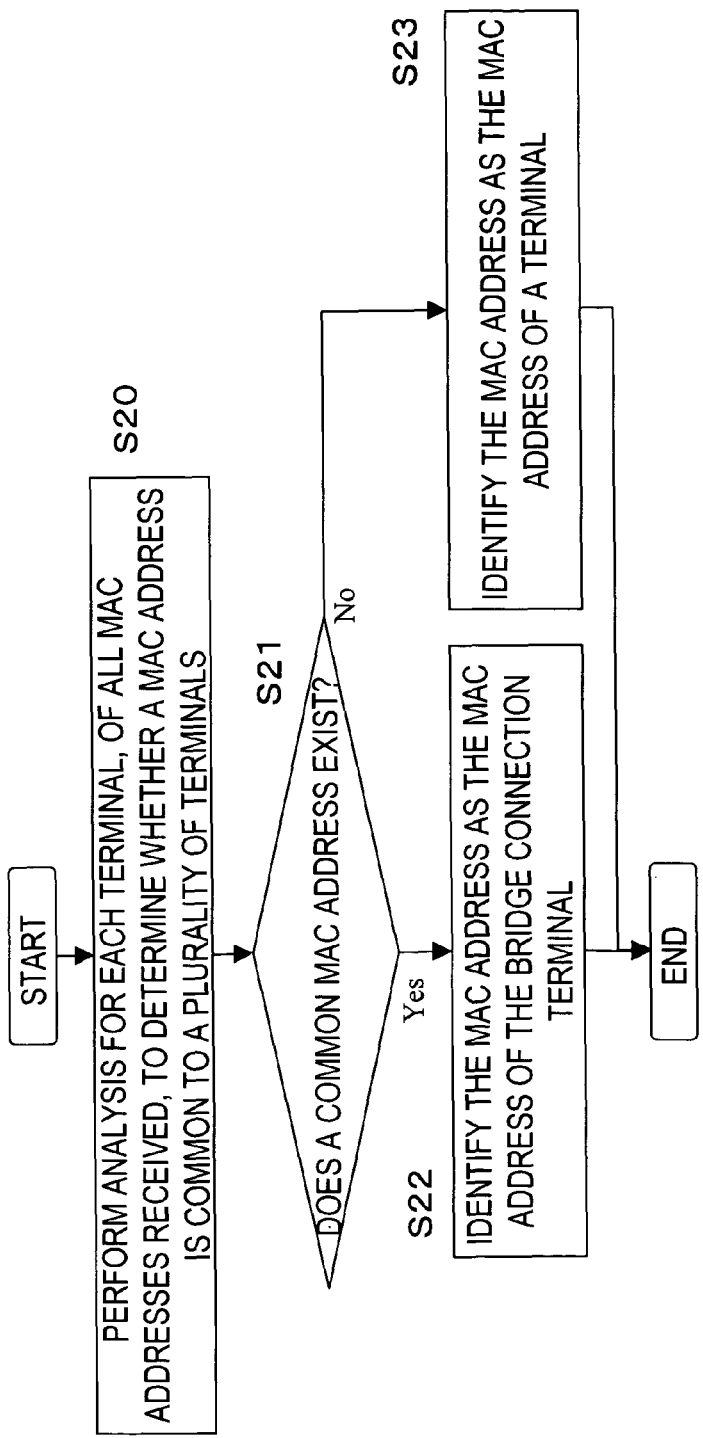
FIG. 5 is a flowchart of first identification processing to identify the MAC address of a terminal for communication.

FIG. 4 is a flowchart of first detection processing by a network fault detection apparatus, to detect an L2 loop due to an L3 bridge connection. FIG. 5 is a flowchart of first identification processing to identify the MAC address of a terminal for communication, based on the first detection processing of FIG. 4.

Referring to the network configuration example of FIG. 3, an example is explained in which the network fault detection apparatus (terminal X) sends ARP requests to terminals A and B, detects the L2 loop due to the L3 bridge connection, and identifies the MAC addresses of terminals A and B and the wire MAC address and the wireless MAC address of the bridge connection terminal (terminal C). The IP addresses of terminals A and B are known.

In FIG. 4, first the packet transmission/reception unit 11 of the network fault detection apparatus (terminal X) broadcasts an ARP request packet requesting the MAC addresses of the plurality of terminals for communication A and B in the subnet (S10). The packet transmission/reception unit 11 receives ARP response packets from the plurality of terminals for communication A and B (S11).

The data analysis unit 12 of the network fault detection apparatus (terminal X) performs analysis to determine whether the received ARP response packets comprise a MAC address which is common to the plurality of terminals for communication A and B (S12).

FIG. 6 is an example of response results from terminals A and B, and shows the MAC addresses comprised by the ARP response packets from terminals A and B. As shown in FIG. 6, the MAC addresses p and q exist and are common to the terminals A and B.

Returning to FIG. 4, when in step S13 there exists a common MAC address, the data analysis unit 12 judges that an L2 loop due to an L3 bridge connection is occurring (S14), and when no common MAC addresses exist, the data analysis unit 12 judges that an L2 loop due to an L3 bridge connection is not occurring (S15). That is, as shown in FIG. 6, when there exists a common MAC address, it is judged that an L2 loop due to an L3 bridge connection is occurring. When there exit no common MAC addresses p and q, and only response packets with the MAC addresses a and b for each terminal for communication are received, it is judged that an L2 loop due to an L3 bridge connection is not occurring.

In FIG. 5, the data analysis unit 12 performs analysis for each terminal to determine whether each of the MAC addresses comprised by received response packets is a common MAC address (S20). If it is judged that a MAC address is a common MAC address, in step S21 this MAC address is identified as the MAC address of a bridge connection terminal (S22); if the address is not a common MAC address, the MAC address is identified as the MAC address of the terminal for communication (S23).

In FIG. 6, the MAC addresses a and b are not MAC addresses common to response packets from terminals A and B, and so the MAC address a is identified as the MAC address of terminal A, and the MAC address b is identified as the MAC address of terminal B. Because the MAC addresses p and q are common MAC addresses comprised by response packets from both terminals A and B, they are identified as MAC addresses of the bridge connection terminal.

(Second Aspect)

Figure 7:
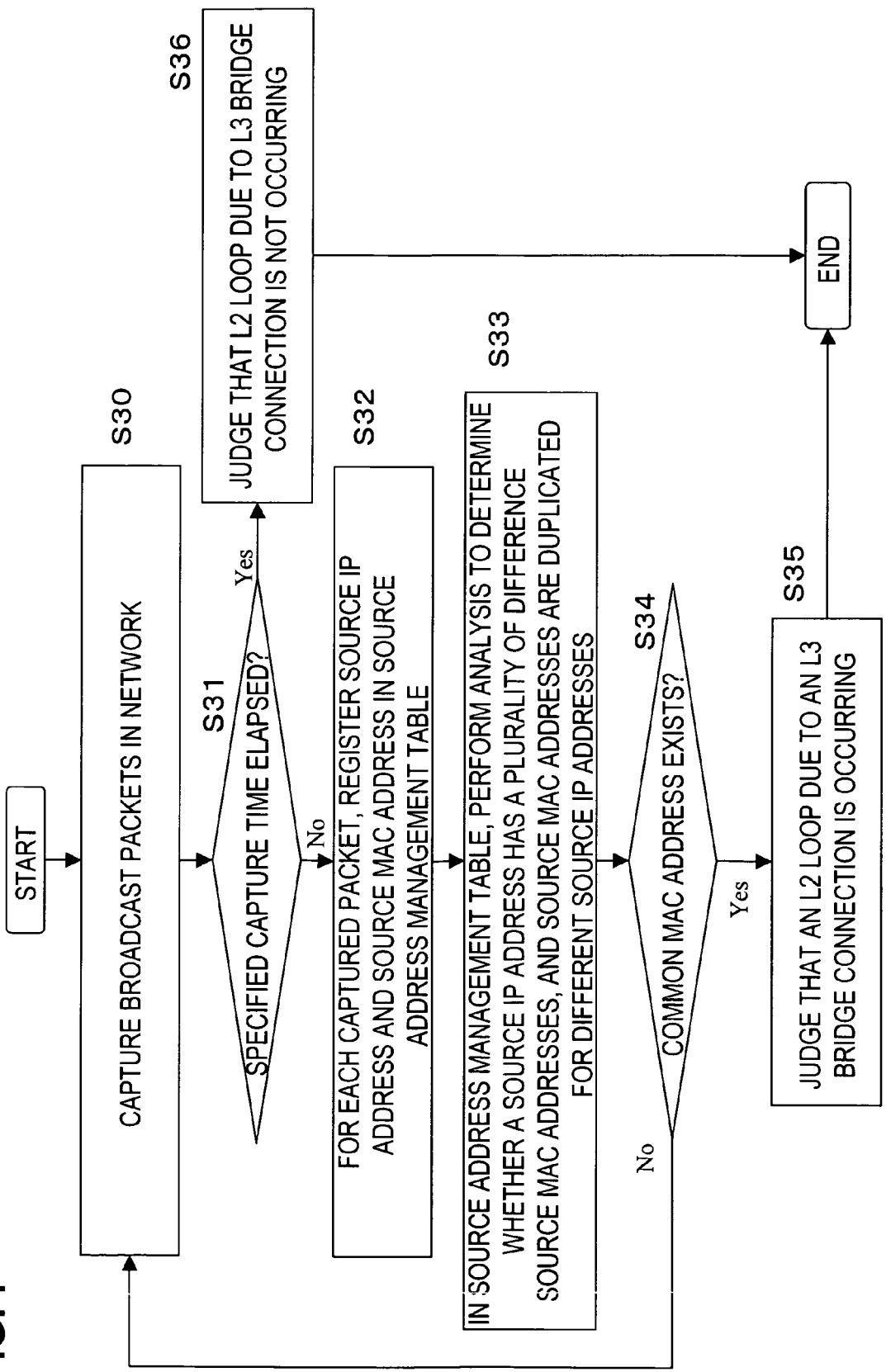
FIG. 7 is a flowchart of second detection processing to detect an L2 loop due to an L3 bridge connection by the network fault detection apparatus of an aspect of this invention.
Figure 8:
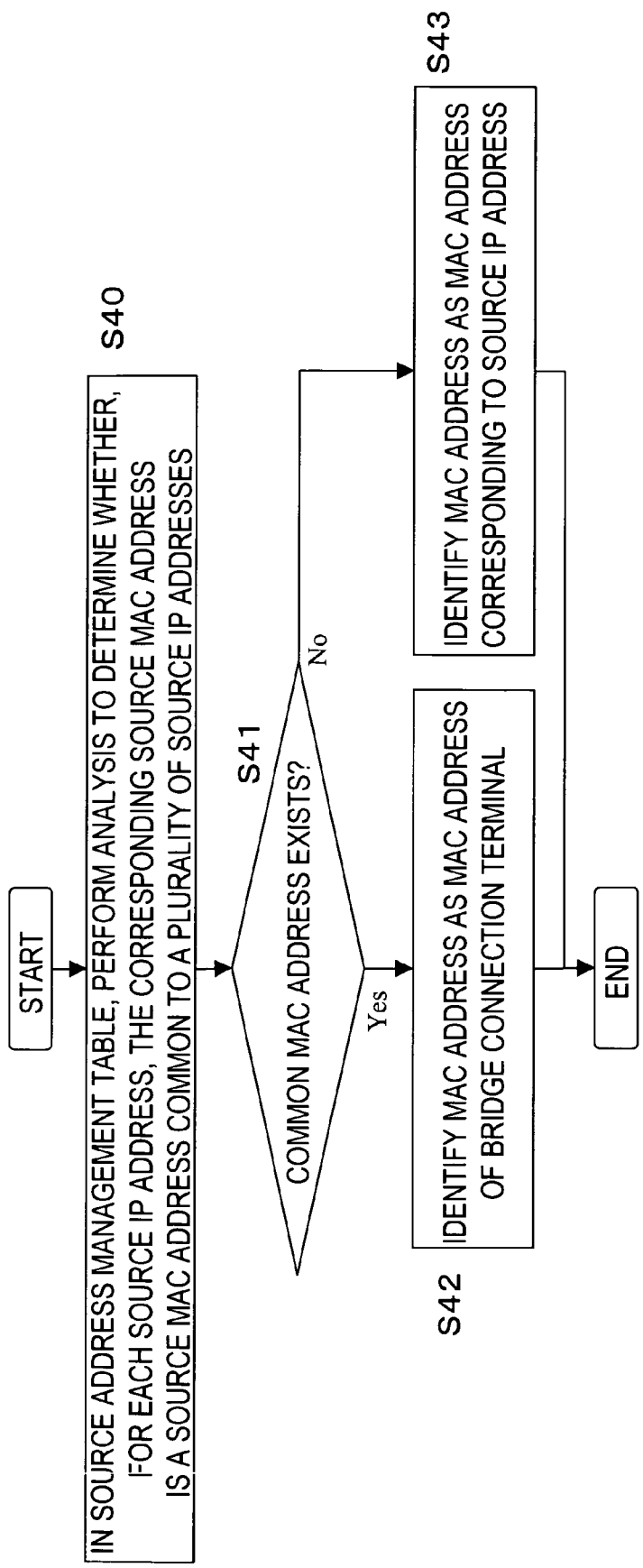
FIG. 8 is a flowchart of second identification processing to identify the MAC address of a terminal for communication.

FIG. 7 is a flowchart of second detection processing by the network fault detection apparatus of this aspect of the invention, to detect an L2 loop due to an L3 bridge connection. FIG. 8 is a flowchart of second identification processing to identify the MAC addresses of terminals for communication, based on the second detection processing of FIG. 7.

In FIG. 7, first the packet transmission/reception unit 11 of the network fault detection apparatus (terminal X) captures broadcast packets circulating in the network for a prescribed time (S30). The specified capture time is set in advance.

During the interval until the specified capture time has elapsed (S31), each time a broadcast packet is captured, the packet transmission/reception unit 11 registers the source IP address and source MAC address of the broadcast packet in the source address management table (S32).

FIG. 9 shows an example of a source address management table. In the example of FIG. 9, source MAC addresses are registered for the terminals A and B and for the switch SW1 for which source IP addresses are registered; for each, a plurality of MAC addresses are registered, including common MAC addresses.

Returning to FIG. 7, the data analysis unit 12 performs analysis to determine whether, in the source address management table, there exists an entry for which a source IP address has a plurality of different source MAC addresses, and the source MAC addresses are duplicated for different source IP addresses (S33). That is, analysis is performed, for all registered MAC addresses, to determine whether there exists a MAC address which is common to a plurality of source IP addresses.

In step S34, when there exists a common MAC address, the data analysis unit 12 judges that an L2 loop caused by an L3 bridge connection has occurred (S35), and when no common MAC addresses exist, processing returns to step S30, and the processing from step S31 to step S34 is repeated until the specified capture time elapses. When no common MAC addresses exist after the specified capture time has elapsed, it is judged that an L2 loop due to an L3 bridge connection is not occurring (S36). That is, as shown in FIG. 9, when common MAC addresses p and q exist for each source IP address, it is judged that an L2 loop due to an L3 bridge connection is occurring. When no common MAC addresses p and q exist, and MAC addresses are each unique to individual source IP addresses, it is judged that an L2 loop due to an L3 bridge connection is not occurring.

In FIG. 8, the data analysis unit 12 performs analysis, for each source IP address in the source address management table, to determine whether the corresponding source MAC address is a source MAC address common to a plurality of source IP addresses (S40). In step S41, when it is judged that a MAC address is a common MAC address, the MAC address is identified as the MAC address of a bridge connection terminal (S42), and when a MAC address is judged not to be a common MAC address, the MAC address is identified as the MAC address of the terminal for communication corresponding to the source IP address (S43).

In FIG. 9, the MAC addresses a, b, s1 are not common MAC addresses, but are MAC addresses which are unique to individual source IP addresses, and so are identified as MAC addresses of notes (terminals, switches) corresponding to source IP addresses. Because the MAC addresses p and q are MAC addresses common to different source IP addresses, they are identified as the MAC addresses of a bridge connection terminal.

(Third Aspect)

By means of the above first and second aspects, an L2 loop due to an L3 bridge connection can be detected, and the MAC address of each node (terminals, switches) can be identified; in addition, the MAC address of the bridge connection terminal can also be identified. In the third and fourth aspects described below, the network configuration example of FIG. 3 is referenced to explain processing to identify the occurrence location, that is, the position of the bridge connection terminal, when occurrence of an L2 loop due to an L3 bridge connection is not detected by the processing of the first and second aspects. As explained in the technology of the prior art, when an L2 loop occurs due to an L3 bridge connection, erroneous MAC addresses are registered in ARP tables, so that terminals (including a network fault detection apparatus) are no longer capable of communication.

Figure 10:
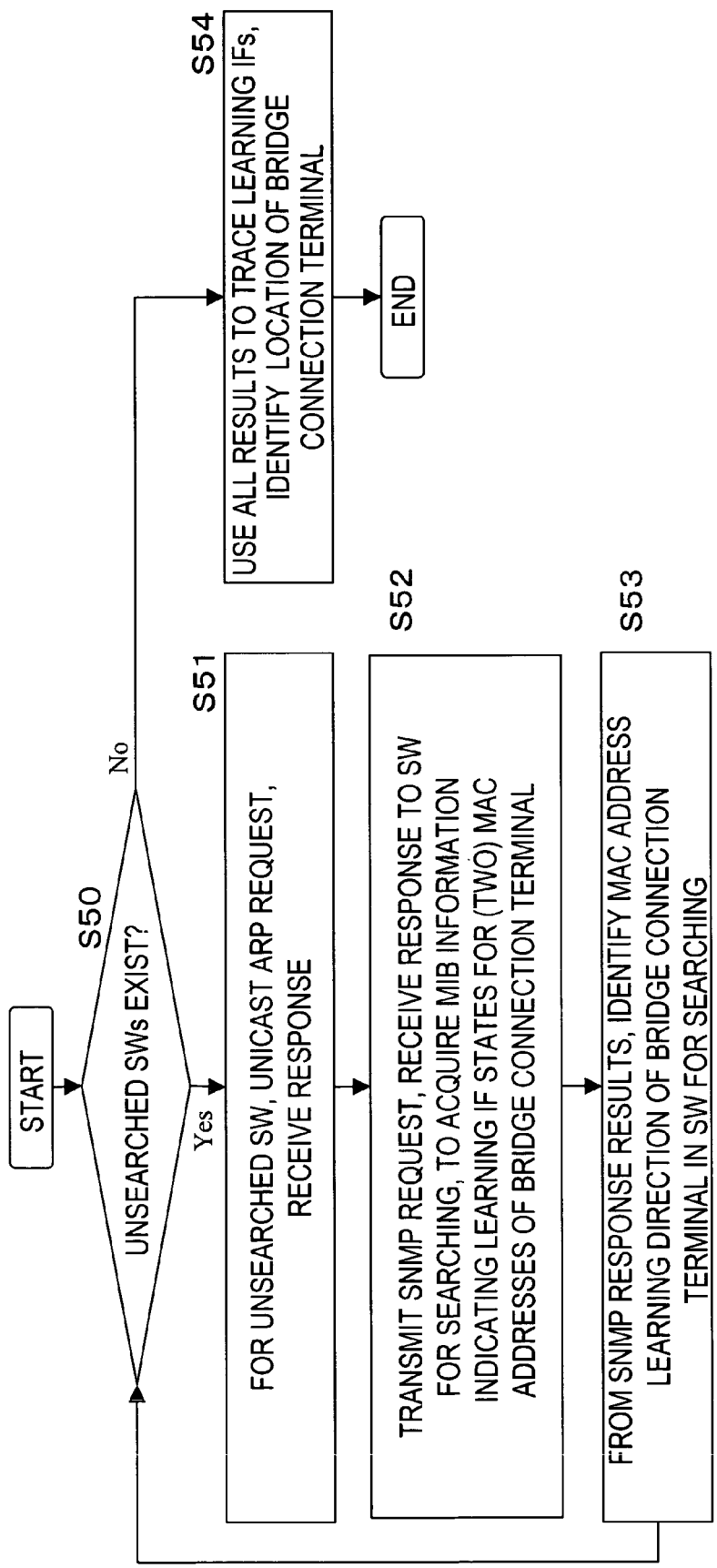
FIG. 10 is a flowchart of first identification processing to identify the location of occurrence of an L2 loop due to an L3 bridge connection.

FIG. 10 is a flowchart of first identification processing to identify the location of occurrence of an L2 loop due to an L3 bridge connection. The following processing is performed for each of the switches within the network. When there are unsearched switches, the packet transmission/reception unit 11 of the network fault detection apparatus (terminal X) selects one among these (S50), unicasts an ARP request to the switch for searching, and receives the ARP response (S51). By this means the correct MAC address of the switch for searching is registered in the ARP table of terminal X, and communication with the switch for searching becomes possible. By means of the above-described first or second aspect, the correct MAC address of each node (including switches) can be identified, and this identified MAC address is used to perform the processing of step S51, so that communication with the switch for searching is restored.

Next, the packet transmission/reception unit 11 transmits an SNMP request to the switch for searching, to acquire MIB information (dot1dTpFdbPort) indicating the learning IF state of the MAC addresses for the bridge connection terminal (in FIG. 3, the two addresses p and q), and receives the SNMP response to this (S52).

In the normal operating state, a switch stores the MAC addresses of source terminals contained in broadcast packets circulating in the network, and also recognizes the direction in which the source terminal of a broadcast packet exists as the input port direction (this is sometimes called "address learning"). The learning IF state is information including the port number of the input port in the direction in which the terminal with a specified MAC address exists.

FIG. 11 shows the learning IF states (port numbers) for the MAC addresses p and q of the bridge connection terminal in each switch. For example, in the SNMP response acquired from switch SW1, the switch SW1 has learned the MAC address p in the direction of IF (port) 2, and has learned the MAC address q in the direction of IF 4.

From the received SNMP response, the data analysis unit 12 identifies the learning direction for the bridge connection terminal MAC address in the switch for searching (S53). For example, if switch SW1 is the switch for searching, then as is clear from FIG. 11, the MAC address p exists in the direction downstream from IF2, and the MAC address q is recognized as existing in the direction downstream from IF4.

After performing the processing of steps S51 to S53 for all switches in the network (S50), the data analysis unit 12 traces the learned IF states in each switch, to identify the location of the bridge connection terminal (S54). For example, upon tracing from the network fault detection apparatus (terminal X), for MAC address p the direction is to IF1 of switch SW4, IF2 of switch SW1, and IF5 of switch SW2; beyond this no switches are connected, and so the location of the bridge connection terminal C having MAC address p can be identified as in the direction of port number 5 of switch SW2. Similarly for MAC address q, the order is port 1 of switch SW4, then port 4 of switch SW1; no further switches are connected, and so the location of the bridge connection terminal C having the MAC address q can be identified as in the direction of port 4 of switch SW1. However, it is impossible to determine which of the MAC addresses p and q is a wire IF MAC address, and which is a wireless IF MAC address.

(Fourth Aspect)

When an L2 loop occurs due to an L3 bridge connection, a large quantity of broadcast packets flow within the L2 loop, and so the ports of switches forming the L2 loop transmit and receive a large number of packets compared with other ports. In a fourth aspect, the traffic amounts of each port of each switch are acquired, and based on this the location of occurrence of the L2 loop due to an L3 bridge connection, that is, the position of the bridge connection terminal, is identified.

Figure 12:
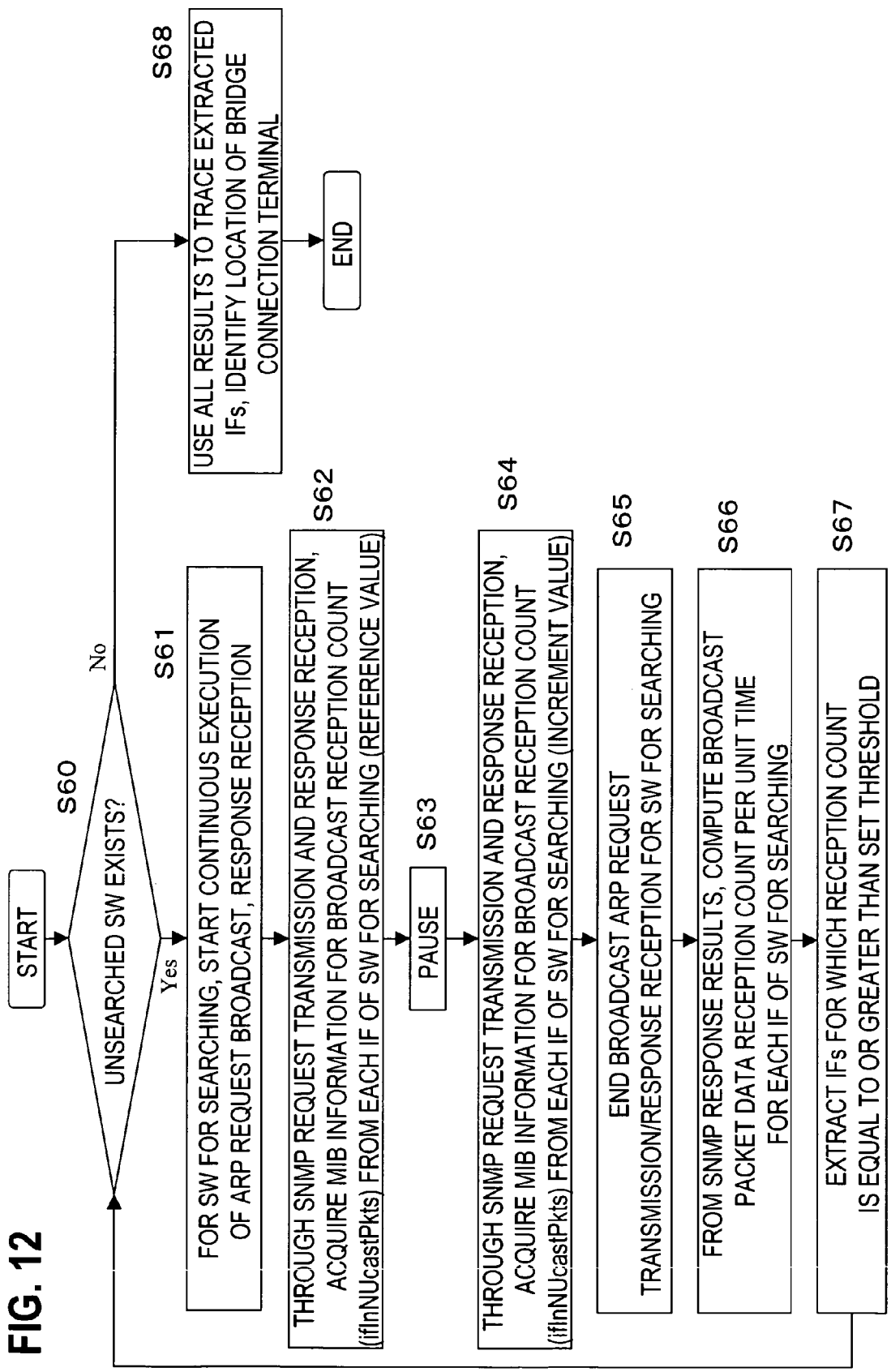
FIG. 12 is a flowchart of second identification processing to identify the location of occurrence of an L2 loop due to an L3 bridge connection; and, FIG. 13 shows an example of an IF for which the per-switch reception count exceeds a threshold value.

FIG. 12 is a flowchart of second identification processing to identify the location of occurrence of an L2 loop due to an L3 bridge connection. When there are unsearched switches (S60), the packet transmission/reception unit 11 selects one switch among them, broadcasts an ARP request to the unsearched switch, and receives the ARP response (S61). This ARP request transmission y broadcast is performed periodically a plurality of times for a fixed length of time. In the above-described third aspect, processing was performed assuming that the MAC address of the unsearched switch was known; but in this fourth aspect, it is assumed that the MAC address of the unsearched switch has not been determined. In this case, if an ARP request is transmitted by broadcast, as explained in the technology of the prior art, a large quantity of erroneous MAC addresses are received as ARP responses, but one correct MAC address is also received for one ARP request. During the interval from the reception of this correct MAC address until reception of the next incorrect MAC address, the correct MAC address is registered in the ARP table, and during this interval an SNMP request is transmitted to acquire MIB information (ifInNUcastPkts) having a broadcast reception count in each IF (port) of the switch; as the SNMP response, MIB information (ifInNUcastPkts) having broadcast reception count information is acquired (S62).

SNMP requests are continuously transmitted a plurality of times, and are transmitted even during intervals in which incorrect MAC addresses are registered; but responses are returned only for SNMP requests transmitted during intervals in which the correct MAC address is registered. That is, the switch can respond only to an SNMP request having the correct MAC address. Thus even when the switch MAC address is unknown, by repeating ARP request transmissions for a fixed length of time, and also repeatedly transmitting SNMP requests in synchronization with the former, an SNMP response can be obtained from the switch.

The received MIB information (ifInNUcastPkts) is stored as a reference value, and after a fixed length of time has elapsed (S63), an SNMP request is again transmitted to acquire MIB information (ifInNUcastPkts) indicating the broadcast packet reception count at each port (IF) of the switch. This time also the SNMP request is repeatedly transmitted, and is continued until MIB information (ifInNUcastPkts) having a broadcast reception count, which is the SNMP response, is obtained (S64). Upon receiving the SNMP response, ARP request transmission by broadcast is halted (S65).

The data analysis unit 12 uses the SNMP response results to compute the data reception count for broadcast packets per unit time, for each IF of the switch for searching (S66). That is, the difference between the broadcast reception counts obtained in steps S62 and S64 is computed. Then, for each switch, IFs for which the reception count per unit time exceeds a prescribed threshold value are extracted (S67).

FIG. 13 shows an example of the IFs, for each switch, for which the reception count exceeds the threshold value. For example, in the case of switch SW1, ports 2 and 4 have received enough broadcast packets that the reception count exceeds the threshold value; in the case of switch SW2, the reception count exceeds the threshold value for ports 1 and 5. Similarly, the reception count exceeds the threshold value for port 1 in the cases of switches SW3 and SW4.

After performing the processing of steps S61 to S67 for all of the switches in the network (S60), the data analysis unit 12 traces the IFs for which the reception count per switch has exceeded the threshold value, to identify the location of the bridge connection terminal (S68). In the example of FIG. 13, SW1 and SW2 have two IFs (right-had, left-hand) extracted as having received large quantities of broadcast packets; one arrives at the bridge connection terminal, and the other arrives at the wireless AP. Specifically, tracing can be performed from IF1 of SW4 to IF2 of SW1, and then to IF5 of SW2, and beyond this no switches are connected, so the location of the bridge connection terminal C can be identified as in the direction of IF5 of switch SW2. Tracing can also be performed from IF1 of SW4 to IF4 of SW1, and in this case also, beyond this is not a switch but the wireless AP; hence the location of the bridge connection terminal C can be identified as in the direction of IF4 of the switch SW1. In this case also, it is impossible to determine which of the MAC addresses p and q is a wire IF MAC address, and which is a wireless IF MAC address.

In the above third aspect, MIB information indicating the learning IF state (dot1dTpFdbPort) was acquired; in place of this, MIB information indicating the broadcast packet reception count (ifInNUcastPkts) is acquired, and in the fourth aspect, IFs for which the reception count per unit time exceeds a threshold value may be extracted, and the position of the bridge connection terminal identified.

Further, in the fourth aspect, when the MAC address of a switch is known, an ARP request may be unicast to the switch for searching, as described in the third aspect, and after restoration of communication, MIB information indicating the broadcast packet reception count (ifInNUcastPkts) may be acquired.

What is claimed is:

1. A network fault detection apparatus, which detects faults in a network including a plurality of nodes including a plurality of terminals and a plurality of relay devices, and also including an L3 bridge connection, the network fault detection apparatus comprising:
   a communication unit receiving first packets as replies from a first node corresponding to a first network address among the plurality of nodes, and receiving second packets as replies from a second node corresponding to a second network address among the plurality of nodes; and
   a detection unit for detecting an L2 loop by the L3 bridge connection which causes a network fault when determining that any of the first packets includes a first source physical address which is also included in any of the second packets, and a second source physical address which is not included in any of the second packets, and any of the second packets includes a third source physical address which is also included in any of the first packets, and a fourth source physical address which is not included in any of the first packets.

2. The network fault detection apparatus according to claim 1, wherein the detection unit identifies the first and the third source physical address as the physical addresses of an L3 bridge connection terminal.

3. The network fault detection apparatus according to claim 2, wherein
   the communication unit acquires information from the plurality of relay devices, the information being relating to the direction of learning of the first and the third physical addresses of the L3 bridge connection terminal, and
   the detection unit judges the direction of the L3 bridge connection terminal based on the information.

4. The network fault detection apparatus according to claim 2, wherein
   the communication unit acquires information from the plurality of relay devices, the information being relating to the amount of broadcast packet traffic for ports of the relay devices, and
   the detection unit judges the direction of the L3 bridge connection terminal based on the information.

5. The network fault detection apparatus according to claim 1, wherein the detection unit identifies the second and the fourth addresses as the physical addresses of the first node and second node, respectively.

6. The network fault detection apparatus according to claim 5, wherein the communication unit restores communication with the first node by unicasting, to the first node, a request packet requesting a packet having the physical address corresponding to the network address of the first node, in use of the second source physical address of the first node identified by the detection unit, and by receiving a response packet to the request packet.

7. The network fault detection apparatus according to claim 1, wherein the communication unit broadcasts a request packet requesting packets having the physical addresses corresponding to the network addresses of the first node and the second node, respectively, and receives, as replies to the request packet, the packets including any of the first, the second, the third, and the fourth source physical addresses.

8. The network fault detection apparatus according to claim 1, wherein the communication unit captures the first packets from the first node and the second packets from the second node among the packets circulating in the network.

9. The network fault detection apparatus according to claim 1, wherein the communication unit communicates with the first node by continuing to broadcast, for a fixed length of time, request packets requesting a packet having a physical address corresponding to the network address of the first node, and by receiving reply packets to the request packets.

10. A network fault detection method, which detects faults in a network including a plurality of nodes including a plurality of terminals and a plurality of relay devices, and also including an L3 bridge connection, the network fault detection method comprising the steps of:

receiving first packets as replies from a first node corresponding to a first network address among the plurality of nodes, and receiving second packets as replies from a second node corresponding to a second network address among the plurality of nodes; and detecting an L2 loop by the L3 bridge connection which causes a network fault when determining that any of the first packets includes a first source physical address which is also included in any of the second packets, and a second source physical address which is not included in any of the second packets, and any of the second packets includes a third source physical address which is also included in any of the first packets, and a fourth source physical address which is not included in any of the first packets.

* * * * *